(12) United States Patent
Tonami et al.

(10) Patent No.: US 10,267,926 B2
(45) Date of Patent: Apr. 23, 2019

(54) RADIATION DETECTOR, AND RADIATION TOMOGRAPHY DEVICE PROVIDED WITH SAME

(71) Applicant: Shimadzu Corporation, Kyoto (JP)

(72) Inventors: Hiromichi Tonami, Kyoto (JP); Tomoaki Tsuda, Kyoto (JP)

(73) Assignee: Shimadzu Corporation, Nishinokyo-Kuwabaracho, Nakagyo-ku, Kyoto-shi, Kyoto (JP)

( * ) Notice: Subject to any disclaimer, the term of this patent is extended or adjusted under 35 U.S.C. 154(b) by 0 days.

(21) Appl. No.: 15/573,471

(22) PCT Filed: Mar. 18, 2016

(86) PCT No.: PCT/JP2016/058850
§ 371 (c)(1),
(2) Date: Nov. 12, 2017

(87) PCT Pub. No.: WO2016/181707
PCT Pub. Date: Nov. 17, 2016

(65) Prior Publication Data
US 2018/0100936 A1 Apr. 12, 2018

(30) Foreign Application Priority Data
May 12, 2015 (JP) .................. 2015-097428

(51) Int. Cl.
*G01T 1/20* (2006.01)
*G01T 1/202* (2006.01)
*G01T 1/16* (2006.01)

(52) U.S. Cl.
CPC .......... *G01T 1/2002* (2013.01); *G01T 1/1603* (2013.01); *G01T 1/202* (2013.01); *G01T 1/2006* (2013.01)

(58) Field of Classification Search
CPC ........ G01T 1/2018; G01T 1/202; G01T 1/244
See application file for complete search history.

(56) References Cited

U.S. PATENT DOCUMENTS

| 2004/0232342 A1* | 11/2004 | Aykac .................. G01T 1/2002 250/367 |
| 2007/0102641 A1 | 5/2007 | Schmand et al. |

(Continued)

FOREIGN PATENT DOCUMENTS

| JP | 2004-233240 A | 8/2004 |
| JP | 2008-525161 | 7/2008 |

(Continued)

OTHER PUBLICATIONS

English Translation of the Written Opinion of the International Search Authority for PCT/JP2016/058850 dated Apr. 10, 2017.
(Continued)

*Primary Examiner* — Yara B Green
(74) *Attorney, Agent, or Firm* — Muir Patent Law, PLLC

(57) ABSTRACT

Provided is a radiation detector 1 which is high in radiation detection sensitivity and is capable of preventing a loss of fluorescence by integrating scintillator crystals C and reflection plates rx and ry without using a permeable material. According to the present invention, the adhesive sheets Sa and Sb are adhered to the ends of scintillator crystals C arranged in a matrix in the height direction. The scintillator crystals C are integrated by the adhesive sheets Sa and Sb. According to the present invention, there is no need to form a scintillator 2 by securing the scintillator crystals C and the reflection plates ry by an adhesive. Therefore, an adhesive before curing does not enter gaps between the scintillator crystal C and the reflection plate ry, and therefore the gap forms an air layer. With such a configuration, a phenomenon that the fluorescence generated inside the scintillator crystal (Continued)

C is emitted out of the scintillator crystal C becomes less likely occur, which in turn can minimize a decrease in the intensity of fluorescence.

17 Claims, 9 Drawing Sheets

(56) References Cited

U.S. PATENT DOCUMENTS

| | | | | |
|---|---|---|---|---|
| 2012/0305782 A1* | 12/2012 | Burr | .................... | G01T 1/1644 250/366 |
| 2013/0134316 A1* | 5/2013 | Nakatsugawa | ......... | G01T 1/202 250/366 |
| 2013/0161521 A1* | 6/2013 | Rose | .................... | G01T 1/2018 250/366 |
| 2013/0284934 A1* | 10/2013 | Kaneko | ................ | A61B 6/4216 250/361 R |
| 2014/0054467 A1* | 2/2014 | Takeda | .................. | G01T 1/2006 250/363.02 |
| 2014/0239195 A1* | 8/2014 | Arimoto | ................ | C09K 11/55 250/487.1 |
| 2014/0239196 A1* | 8/2014 | Shoji | ...................... | G01T 1/202 250/488.1 |
| 2015/0091117 A1* | 4/2015 | Heo | ...................... | G01T 1/2002 257/432 |
| 2015/0204987 A1* | 7/2015 | Okada | .................... | G01T 1/2018 250/369 |
| 2015/0268357 A1* | 9/2015 | Nitta | ..................... | G01T 1/2008 156/247 |
| 2016/0027847 A1* | 1/2016 | Liu | ......................... | A61B 6/42 378/62 |

FOREIGN PATENT DOCUMENTS

| | | |
|---|---|---|
| JP | 2008-256479 A | 10/2008 |
| JP | 2012-194139 A | 10/2012 |
| WO | WO 2011/161897 | * 12/2011 |

OTHER PUBLICATIONS

English Translation of the International Search Report dated Jun. 7, 2016.

Notification of Reasons for Refusal, issued from the Japanese Patent Office for Japanese Patent Application No. 2017-517637, dated Apr. 17, 2018 (with English-language machine-translation of same) (6 pages total).

* cited by examiner

US 10,267,926 B2

RADIATION DETECTOR, AND RADIATION TOMOGRAPHY DEVICE PROVIDED WITH SAME

TECHNICAL FIELD

The present invention relates to a radiation detector equipped with a scintillator that converts radiation into fluorescence and a radiation tomography apparatus equipped with the same.

BACKGROUND ART

As a radiation detector for detecting radiation, there conventionally exists a radiation detector configured as shown in FIG. 15. Such a radiation detector is provided with a scintillator 52 constituted by scintillator crystals C each having a rectangular parallelepiped shape arranged in a matrix. The scintillator crystal C is made of a material that converts radiation into fluorescence when radiation is incident. The fluorescence generated in the scintillator 52 is detected by a light detector 53 optically coupled to the scintillator 52 (see, for example, Patent Document 1).

FIG. 16 shows a structure of the scintillator 52. A reflection plate r that reflects fluorescence is arranged between adjacent scintillator crystals C. With this reflection plate r, adjacent scintillator crystals C are optically separated. The scintillator 52 is configured by assembling the scintillator crystals C and the reflection plates r as shown in FIG. 16.

The scintillator crystal C and the reflection plate r are integrated by a permeable material t that allows fluorescence to pass through. The permeable material t is formed by curing a liquid adhesive poured into the gap between the scintillator crystal C and the reflection plate r. With this permeable material t, the scintillator crystal C and the reflection plate r do not separate from each other. The permeable material t has a function of retaining the shape of the scintillator 52.

How the fluorescence generated by the conversion of the radiation in the scintillator crystal C advances inside the scintillator will be described. The asterisk in FIG. 16 shows a generation point of fluorescence located inside the scintillator crystal C. As shown in FIG. 16, a part of the fluorescence generated at the asterisk tries to exit from the side surface of the scintillator crystal C. Such fluorescence is hampered by the reflection plate r and never reaches the adjacent scintillator crystal C. As a result, the fluorescence eventually exits from the generation source scintillator crystal C to the light detector 53 side.

In other words, the position at which the fluorescence is incident to the light detector 53 is directly below the generation point of the fluorescence in the scintillator 52. Since the light detector 53 can determine the incident position of the fluorescence, the incident position of the fluorescence discriminated by the light detector 53 indicates the position of the generation point of the fluorescence in the scintillator 52.

If the reflection plate r is not provided between scintillator crystals C, the fluorescence generated in the scintillator crystal C spreads out over a wide range of the scintillator 52, resulting in difficulty of identifying the generation point of the fluorescence. The reflection plate r of the scintillator 52 plays an important role in identifying the generation point of the fluorescence.

PRIOR ART

Patent Document

Patent Document 1: Japanese Unexamined Patent Application Publication (Translation of PCT Application) No. 2008-525161

SUMMARY OF THE INVENTION

Problems to be Solved by the Invention

However, the conventional radiation detector has the following problems. That is, in the conventional radiation detector, the permeable material bonding the scintillator crystal C and the reflection plate r weakens the intensity of the fluorescence.

FIG. 17 explains problems of a conventional configuration. On the left side of FIG. 17, a state in which the fluorescence generated at the generation point indicated by the asterisk is reflected by the reflection plate r is shown. The fluorescence at this time follows the following complicated paths. That is, the fluorescence exits from the scintillator crystal C to the permeable material t, crosses the permeable material t, is incident to the reflection plate r, is reflected therein, again crosses the permeable material t, and is incident to the scintillator crystal C. The fluorescence is partially absorbed while crossing the permeable material t. Note that the entire fluorescence is not reflected even at the time of being reflected by the reflection plate r. Furthermore, depending on the material of the reflection plate r, there are some materials whose refractive index is close to that of the permeable material t. In this case, the fluorescence exited from the scintillator crystal C toward the permeable material t will pass through the reflection plate r and leak out to the adjacent scintillator crystal C. In this way, when the phenomenon of exiting from the scintillator crystal C toward the permeable material t occurs, the intensity of the fluorescence incident to the light detector 53 is reduced.

In order not to reduce the intensity of the fluorescence incident to the light detector 53, it is better to configure so as not to exit the fluorescence to the outside of the scintillator crystal C as much as possible. In this regard, there is a phenomenon called fluorescence total reflection. The right side of FIG. 17 explains the total reflection of fluorescence. The fluorescence generated at the generation point indicated by the asterisk is reflected on the surface of the scintillator crystal C before reaching the reflection plate r. Such reflection is called total reflection. In such total reflection, since the fluorescence will not traverse the permeable material t and will not be reflected by the reflection plate r, the decrease in intensity is further suppressed.

A conventional radiation detector is configured to be less likely to cause the total reflection of the fluorescence as described with reference to the right side of FIG. 17. This is because the permeable material t is solid and has a reasonably high refractive index. The higher the refractive index of the permeable material t is and the closer it is to the refractive index of the scintillator crystal C, the greater the total reflection critical angle becomes, and the fluorescence becomes more likely to pass through the permeable material t from the scintillator crystal C. The total reflection critical angle θ0 in the case where fluorescence is emitted from a first medium to a second medium can be obtained by the Snell's law as $\theta_0 = \sin^{-1}(n2/n1)$. Where n2 is a refractive index of the second medium (permeable material t), n1 is a refractive index of the first medium (scintillator crystal C).

As shown in the right side of FIG. 17, if the permeable material t is replaced with an air layer, the total reflection of the fluorescence becomes likely to occur. This is because the air's refractive index is small and accordingly the total reflection critical angle becomes smaller.

Also, as shown in FIG. 18, in the case where air bubbles are mixed in the permeable material t constituting the scintillator 52 of a conventional configuration, when fluorescence hits the bubbles, the fluorescence diffusely reflects. Such a phenomenon causes decrease of intensity or variation of the fluorescence incident to the light detector 53.

As will be understood above, replacing the permeable material of the scintillator 52 with air makes it possible to more efficiently detect fluorescence, which in turn can provide a radiation detector with high radiation detection sensitivity. In particular, when used as a radiation detector for PET devices, it becomes possible to provide a radiation detector with an extremely excellent temporal resolution. However, the permeable material t has an important function of integrating each scintillator crystal C and the reflection plate r constituting the scintillator 52. If it is configured such that the permeable material t is replaced with air, the entire scintillator 52 cannot keep its own shape and it will collapse. If the scintillator 52 is not integrally formed, the radiation detector cannot keep its shape.

The present invention was made in view of such circumstances, and an object of the present invention is to provide a radiation detector with high radiation detection sensitivity capable of preventing fluorescence loss by integrating scintillator crystals and reflection plates without using a permeable material.

Means for Solving the Problems

In order to solve the aforementioned problems, the present invention has the following configuration.

That is, a radiation detector according to the present invention includes: scintillator crystals that convert radiation into fluorescence; reflection plates that reflect the fluorescence, the reflection plate being provided in a gap between the scintillator crystals arranged in a matrix; an air layer provided at a position sandwiched by the reflection plate and the scintillator crystal; and an adhesive sheet having adhesiveness adhered to an end of each of the scintillator crystals in a height direction, wherein a scintillator is formed by integrating the scintillator crystals with the adhesive sheet.

[Functions and Effects] According to the present invention, a scintillator can be configured by integrating scintillator crystals and reflection plates without using a permeable material. That is, according to the present invention, an adhesive sheet is adhered to an end of scintillator crystals C in a height direction, the scintillator crystals being arranged in a matrix. The scintillator crystals are integrated by this adhesive sheet. With this configuration, there is no need to form a scintillator by securing the scintillator crystals and reflection plates with an adhesive, so that the adhesive before curing will not enter the gap between the scintillator crystal and the reflection plate. Therefore, the gap becomes an air layer. When the gap between the scintillator crystal and the reflection plate is an air layer, the phenomenon that the fluorescence generated in the scintillator crystal is emitted out of the scintillator crystal becomes less likely to occur. This makes it possible to suppress that loss occurs when the fluorescence is reflected by the reflection plate and the fluorescence leaks to the adjacent scintillator crystal through the reflection plate. As a result, the decrease in the intensity of the fluorescence can be suppressed as much as possible.

According to the present invention, in particular, when used as a radiation detector for PET devices, it becomes possible to provide a radiation detector which is extremely excellent in temporal resolution.

Further, in the aforementioned radiation detector, it is more preferred that the adhesive sheet be a transparent sheet that allows fluorescence to pass through and that a light detector that detects the fluorescence or a light guide that guides the fluorescence generated by the scintillator to the light detector be optically coupled to a surface of the adhesive sheet opposite to a surface to which the scintillator crystals are adhered.

[Functions and Effects] The aforementioned configuration shows a specific configuration of the present invention. When an adhesive sheet is positioned between each scintillator crystal and the light detector and is a transparent sheet that allows the fluorescence to pass through, the fluorescence generated by the scintillator crystal will be assuredly incident to the light detector. As a specific configuration of the present invention, it may be configured to include a light guide.

In the aforementioned radiation detector, it is more preferred that the surface of the adhesive sheet opposite to a surface to which the scintillator crystals are adhered have adhesiveness and the adhesive sheet be adhered to the light detector or the light guide.

[Functions and Effects] The aforementioned configuration shows a more specific configuration of the present invention. When each scintillator crystal and the light detector are integrated by a common adhesive sheet adhered thereto, it is possible to reliably configure the optical coupling between the scintillator crystal and the light detector. As a specific configuration of the present invention, each scintillator crystal and the light guide may be integrated by a common adhesive sheet adhered thereto.

Further, in the aforementioned radiation detector, it may be configured such that the surface of the adhesive sheet opposite to a surface to which the scintillator crystals are adhered does not have adhesiveness and the scintillator is optically coupled to the light detector or the light guide by a connection material.

[Functions and Effects] The aforementioned configuration shows a more specific configuration of the present invention. The radiation detector of the present invention may be realized by an adhesive sheet of a single-sided adhesive type.

It is more preferred that in the radiation detector, when the light detector is composed of a photomultiplier tube which is a vacuum tube, the adhesive sheet be adhered to the light detector in a state in which the adhesive sheet is deformed in accordance with a distortion of a light receiving surface of the light detector to which the fluorescence is incident.

[Functions and Effects] The aforementioned configuration shows a more specific configuration of the present invention. The light detector of the present invention may also be a photomultiplier tube. The adhesive sheet is adhered to the light detector in a state in which the adhesive sheet is deformed in accordance with a distortion of a light receiving surface of the light detector to which the fluorescence is incident, so that the distance between each scintillator crystal and the light detector becomes constant regardless of the scintillator crystals. With this configuration, it is possible to uniform the optical conditions of the respective scintillator crystals.

Further, in the aforementioned radiation detector, it is more preferred that the light detector includes a semiconductor light receiving element.

[Functions and Effects] The aforementioned configuration shows a more specific configuration of the present invention. The light detector may be configured to have a semiconductor light receiving element.

Further, it is more preferred that in the aforementioned radiation detector, the adhesive sheet be provided at each of both ends of the scintillator crystals in the height direction.

[Functions and Effects] The aforementioned configuration shows a more specific configuration of the present invention. In cases where the adhesive sheet is provided at each of both ends of the scintillator crystal in the height direction, the physical strength of the scintillator increases.

Further, it is more preferred that in the aforementioned radiation detector, the adhesive sheet be an acrylic adhesive sheet.

[Functions and Effects] The aforementioned configuration shows a more specific configuration of the present invention. When the adhesive sheet is an acrylic adhesive sheet, it is possible to more assuredly configure the scintillator.

Effects of the Invention

According to the present invention, a scintillator can be configured by integrating scintillator crystals and reflection plates without using a permeable material. That is, according to the present invention, an adhesive sheet is adhered to an end of scintillator crystals C in a height direction, the scintillator crystals being arranged in a matrix. The scintillator crystals are integrated by this adhesive sheet. With this configuration, there is no need to form a scintillator by securing the scintillator crystals and reflection plates with an adhesive, so that the adhesive before curing will not enter the gap between the scintillator crystal and the reflection plate. Therefore, the gap becomes an air layer. When the gap between the scintillator crystal and the reflection plate is an air layer, the phenomenon that the fluorescence generated in the scintillator crystal is emitted out of the scintillator crystal becomes less likely to occur. This makes it possible to suppress that loss occurs when the fluorescence is reflected by the reflection plate and the fluorescence leaks to the adjacent scintillator crystal through the reflection plate. As a result, the decrease in the intensity of the fluorescence can be suppressed as much as possible. According to the present invention, in particular, when used as a radiation detector for PET devices, it becomes possible to provide a radiation detector which is extremely excellent in temporal resolution.

EMBODIMENTS FOR CARRYING OUT THE INVENTION

Hereinafter, embodiments for carrying out the invention will be described. γ (gamma) radiation corresponds to the radiation of the present invention.

Example 1

<Overall Configuration of Radiation Detector>

Figure 1:
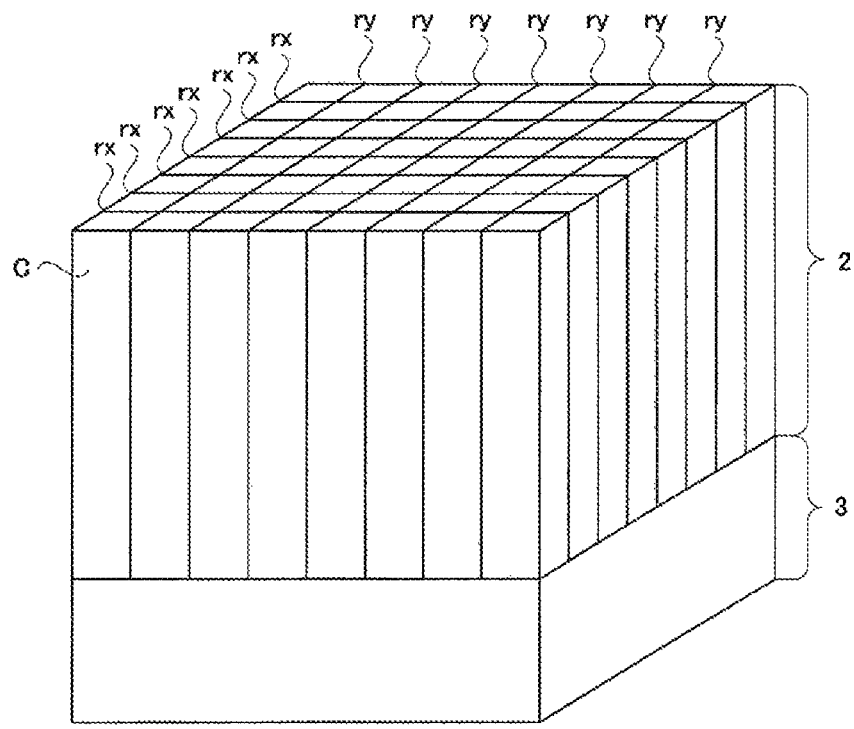
FIG. 1 is a perspective view for explaining an overall configuration of a radiation detector according to Example 1.

A radiation detector 1 is equipped with a scintillator 2 configured by arranging scintillator crystals C in a matrix as shown in FIG. 1 and a light detector 3 provided on the lower surface of the scintillator 2 and configured to detect fluorescence generated from the scintillator 2. The scintillator 2 shown in FIG. 1 includes a total of 64 scintillator crystals C elongated in the height direction and arranged in a two-dimensional 8×8 matrix.

The scintillator crystal C is made of LGSO $(Lu, Gd)_2SiO_5$ containing cerium elements, and has characteristics that emit fluorescence when γ-rays are incident. Instead of LGSO, the scintillator crystal C may be made of other materials such as GSO $(Gd_2SiO_5)$. The scintillator crystal C converts γ-rays into fluorescence.

The scintillator 2 includes laterally-extending reflection plates rx and longitudinally-extending reflection plates ry. The reflection plate rx is arranged between adjacent scintillator crystals C arranged in the longitudinal direction and the reflection plate ry is arranged between adjacent scintillator crystals C arranged in the lateral direction. Therefore, adjacent scintillator crystals C are separated by either the reflection plate rx or the reflection plate ry. The reflection plates rx and ry are each made of a material such as an ESR (Enhanced Specular Reflector) film that reflects fluorescence.

<Adhesive Sheet>

Figure 2:
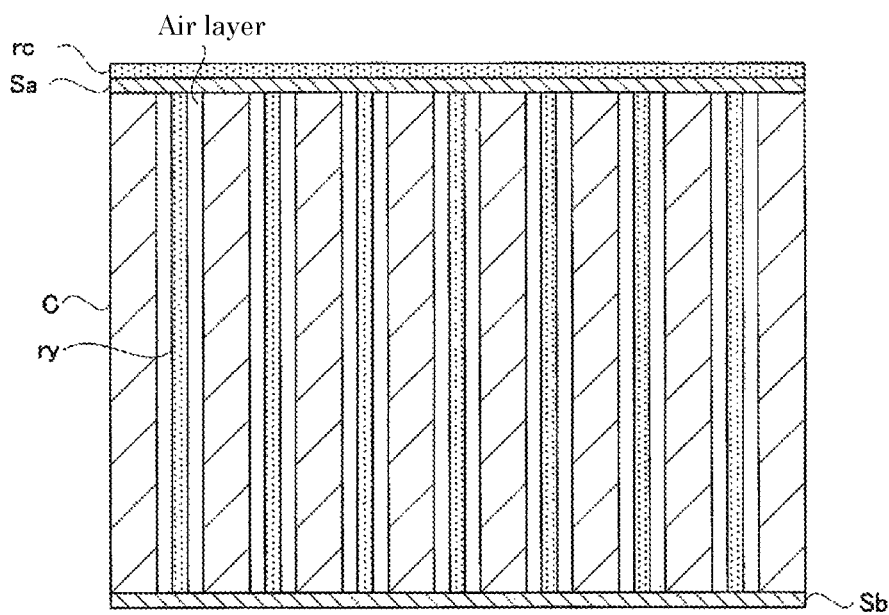
FIG. 2 is a plan view for explaining a configuration of a scintillator according to Example 1.

Since adhesive sheets Sa and Sb for adhering scintillator crystals C are provided on both end faces of the scintillators 2 in the height direction, these sheets will be described. FIG. 2 is a plan view showing a side surface of the scintillator 2. As shown in FIG. 2, the scintillator 2 is configured by alternately arranging a reflection plate ry and a scintillator crystal C, and an air layer is provided at a position between the reflection plate ry and the side surface of the scintillator crystal C. This air layer is filled with air entered from the atmosphere between the reflection plate ry and the scintillator crystal C. Therefore, the side surface of the scintillator crystal C and the reflection plate ry are not adhered by an adhesive. Note that an air layer is also provided at the position between the reflection plate rx and the side surface of the scintillator crystal C in FIG. 1.

As shown in FIG. 2, in the scintillator 2 of the present invention, adhesive sheets Sa and Sb are provided at both respective ends of each scintillator crystal C in the height direction thereof. Each of the adhesive sheets Sa and Sb has adhesiveness and is adhered to the end portion of each scintillator crystal C in the height direction thereof. The scintillator 2 is formed by physically integrating the scintillator crystals C and the reflection plates ry by the adhesive sheets Sa and Sb.

The adhesive sheet Sa is adhered to one end face of the scintillator 2 in the height direction (the incident surface of the scintillator 2 to which radiation is incident). In all of the scintillator crystals C constituting the scintillator 2, the adhesive sheet Sa is adhered to one end faces of the scintillator crystals C. The adhesive sheet Sa is made of, for example, an acrylic adhesive material and has a property of adhering to an object with which the adhesive sheet comes into contact. The adhesive sheet Sa is adhered to one end face of each scintillator crystal C and cannot peel off therefrom. The adhesive sheet Sa is also adhered to one end portions of the reflection plates rx and ry (the incident surface side end portions of the scintillator 2 to which radiation is incident). The scintillator crystals C and the reflection plates rx and ry are physically integrated on one end side in the height direction by the adhesive sheet Sa. The adhesive sheet Sa is made of a transparent member which allows fluorescence to pass through.

The surface of the adhesive sheet Sa opposite to the surface adhered to the scintillator crystal C is adhered to the reflection plate rc that reflects fluorescence. As a result, the adhesive sheet Sa cannot peel off the reflection plate rc. The reflection plate rc is made of, for example, an ESR film. The scintillator 2 and the reflection plate rc are integrated by the adhesive sheet Sa.

The adhesive sheet Sb is adhered to the other end face of the scintillator 2 in the height direction (the connection surface to which the light detector 3 is connected). In all of the scintillator crystals C constituting the scintillator 2, the adhesive sheet Sb is adhered to the other end faces of the scintillator crystals C. The adhesive sheet Sb is made of, for example, an acrylic adhesive material having adhesiveness and has a property of adhering to an object with which the adhesive sheet comes into contact. The adhesive sheet Sb is adhered to the other end face of each scintillator crystal C and will not peel off therefrom. The adhesive sheet Sb is also adhered to the other end face of the reflection plates rx and ry (the connection face side end to which the light detector 3 of the scintillator 2 is connected). The scintillator crystals C and the reflection plates rx and ry are physically integrated on the other end side in the height direction by the adhesive sheet Sb. The adhesive sheet Sb is made of a transparent member which allows fluorescence to pass through.

FIG. 2 shows that two adhesive sheets Sa and Sb are provided at both ends of the scintillator crystals C. However, in the case where the scintillator crystals C can be integrated with only the adhesive sheet Sb, the adhesive sheet Sa can be omitted. In this case, it is configured such that the scintillator 2 and the reflection plate rc are in direct contact with each other.

FIG. 2 shows a side surface among the side surfaces of the scintillator 2 in which each of the scintillator crystals C arranged in the lateral direction is isolated by the reflection plates ry. A side surface among the side surfaces of the scintillator 2 in which each of the scintillator crystals C arranged in the vertical direction is isolated by the reflection plates rx is also the same in configuration as shown in FIG. 2.

The wording "adhere" is defined in JIS Z0109 as "it means a kind of bonding, and is characterized in that bonding can be performed only by applying slight pressure at room temperature for a short time without using water, solvent, heat, etc.". Also, adhesiveness is a physical property having both sticky physical properties and elasticity. When a material made of a substance having adhesiveness is pressed against an adherence target solid substance, the material is adhered to the solid substance as it is without changing its physical properties. On the other hand, in the case of an adhesive having general adhesiveness, the adhesive which initially has soft physical properties is cured and adhered to an adherence target object in a state in which physical property changes have been accompanied. It can be said that the adhesiveness is different from general adhesiveness in that no curing phenomenon occurs.

The adhesive sheet Sb is a double-sided adhesive sheet, and the surface of the adhesive sheet opposite to the surface adhered to each of the scintillator crystals also has adhesiveness. The scintillator 2 is adhered to the light detector 3 due to the adhesiveness of this adhesive sheet Sb. The details of the state will be described later.

Figure 3:
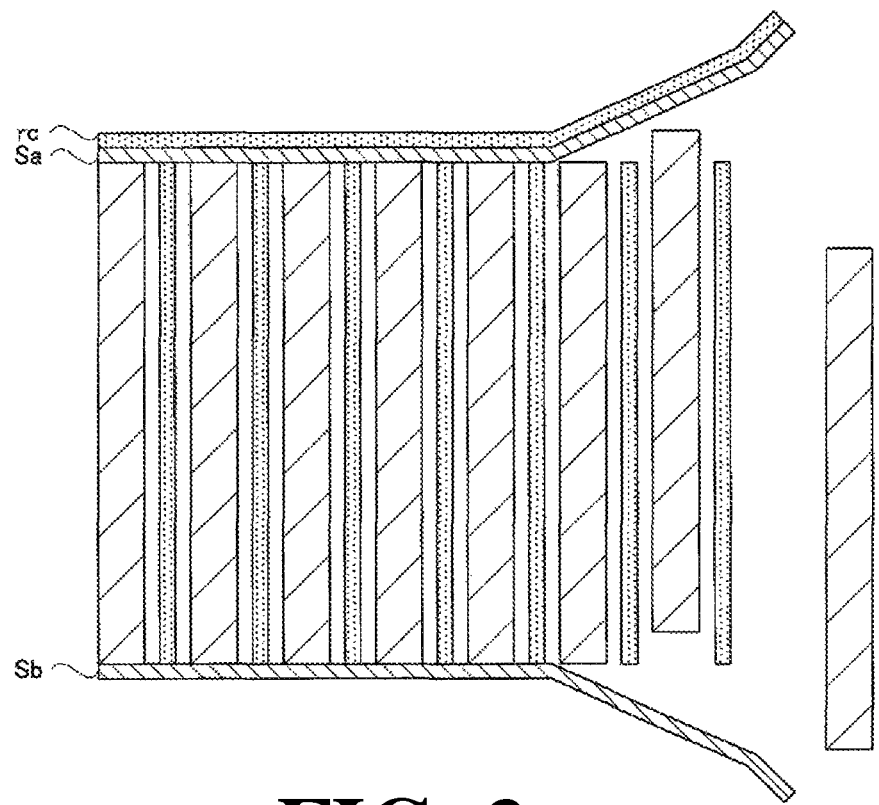
FIG. 3 is a plan view for explaining an adhesive sheet according to Example 1.

FIG. 3 shows a state in which the adhesive sheets Sa and Sb are peeled off from both end faces of the scintillator 2. When the adhesive sheets Sa and Sb are peeled off, the scintillator crystals C constituting the scintillator 2 will be unconstrained and goes out of the scintillator 2. The reason that the scintillator 2 can keep the rectangular parallelepiped shape as an integrated unit is that the adhesive sheets Sa and Sb are adhered to each of the scintillator crystals C and therefore the scintillator crystals C are connected.

Figure 4:
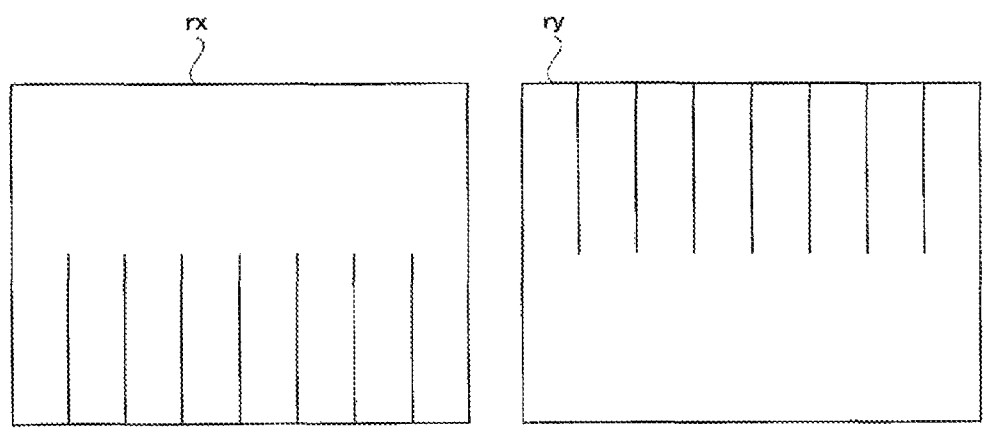
FIG. 4 is a plan view for explaining a reflection plate according to Example 1.

FIG. 4 shows reflection plates rx and ry. The reflection plate rx has a plurality of grooves extending in the height direction. All of these grooves extend from the bottom portion of the reflection plate rx. Also, the reflection plate ry also has a plurality of grooves extending in the height direction. All of these grooves extend from the top portion of the reflection plate ry.

Figure 5:
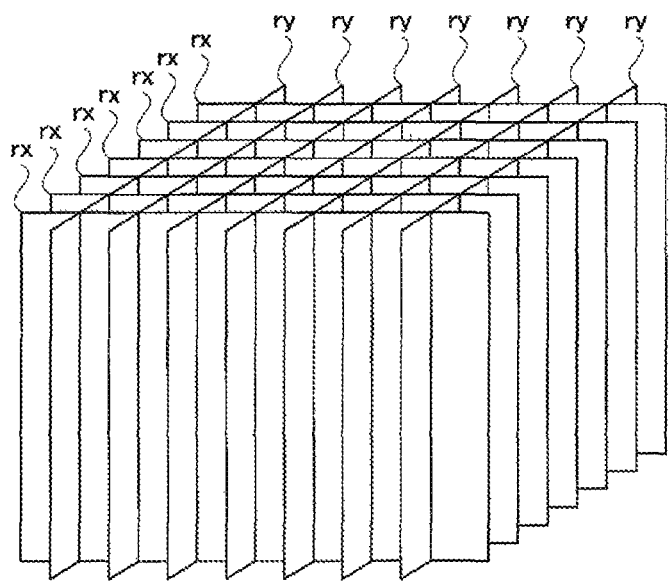
FIG. 5 is a perspective view for explaining pairs of reflection plates according to Example 1.

The reflection plate rx and the reflection plate ry form a reflection plate frame as shown in FIG. 5 by fitting mutual grooves together. The reflection plate frame is configured by seven reflection plates rx extending in the lateral direction and seven reflection plates ry extending in the longitudinal direction. The reflection plate frame has cells for accommodating scintillator crystals C.

Figure 6:
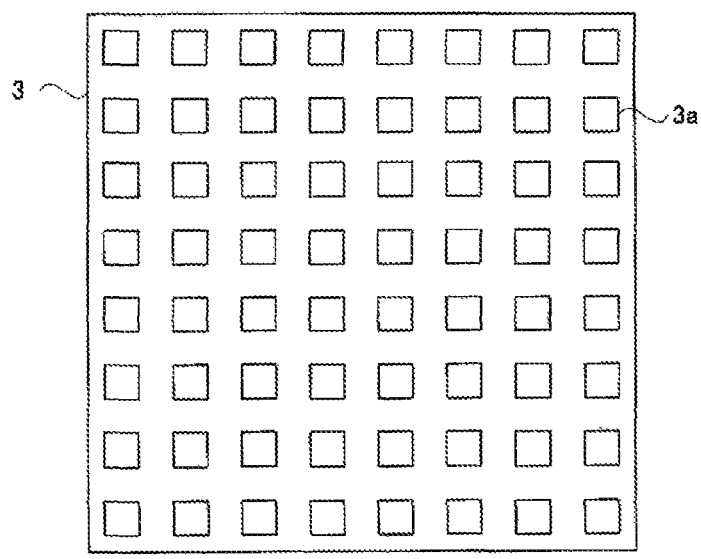
FIG. 6 is a plan view for explaining a light detector according to Example 1.

FIG. 6 shows an incident surface to which the fluorescence in the light detector 3 is incident. On the incident surface of the light detector 3, a semiconductor light receiving elements 3a for detecting fluorescence are arrayed in a matrix. On the incident surface, the semiconductor light receiving elements 3a are arranged in a 8×8 two-dimensional matrix form. The incident surface has a total of 64 pieces of semiconductor light receiving elements 3a.

Figure 7:
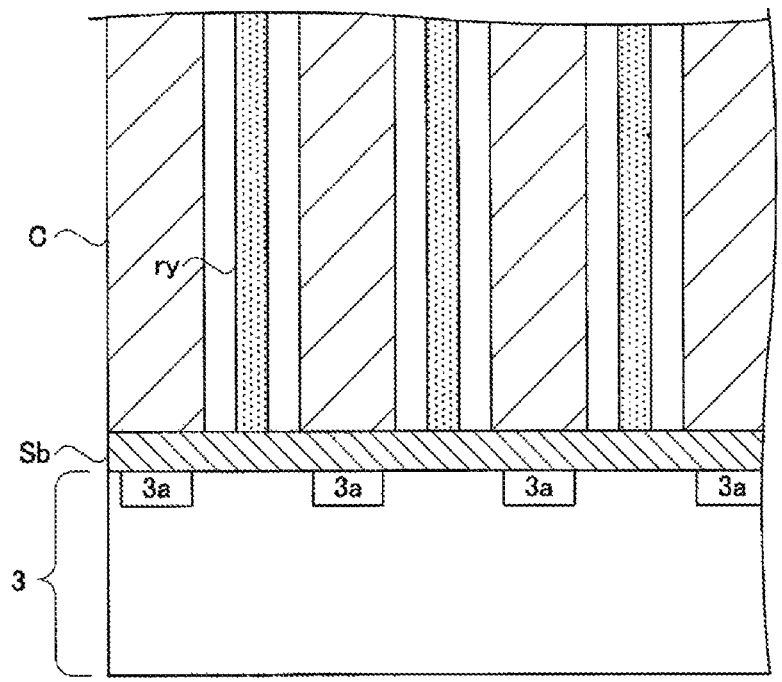
FIG. 7 is a schematic diagram for explaining an adhesive sheet according to Example 1.

The adhesive sheet Sb is adhered to the semiconductor light receiving elements 3a, so this point will be explained. FIG. 7 shows the state in which the adhesive sheet Sb of the scintillator 2 is adhered to the incident surface of the light detector 3. The lower surface of the adhesive sheet Sb is adhered to each of the semiconductor light receiving elements 3a provided at the incident surface of the light detector 3. Each of the scintillator crystals C constituting the scintillator 2 and each of the semiconductor light receiving elements 3a of the light detector 3 are optically coupled in a one-to-one correspondence. The light detector 3 for detecting fluorescence is optically coupled to the surface of the adhesive sheet Sb opposite to the surface of the adhesive sheet S to which each scintillator crystal C is adhered. The surface of the adhesive sheet Sb opposite the surface to which each scintillator crystal C is adhered has adhesiveness and the adhesive sheet Sb is adhered to the light detector 3.

Further, the adhesive sheet Sb has the property of deforming according to the three-dimensional shape of the bonding target. Therefore, the adhesive sheet Sb absorbs the difference between the three-dimensional shape of the lower end portions of the scintillator crystal array and the three-dimensional shape of the incident surface of the light detector to assuredly integrate them with each other. The adhesive sheet Sb is adhered to the lower end portion of the reflection plate ry. FIG. 7 shows a side surface among the side surfaces of the scintillator 2 in which each of the scintillator crystals C arranged in the lateral direction is isolated by the reflective plates ry. A side surface among the side surfaces of the scintillator 2 in which each of the scintillator crystals C arranged in the vertical direction is isolated by the reflective plates rx is also the same in configuration as shown in FIG. 7. The state of adhering the adhesive sheet Sb to the lower end portion of the reflection plate rx is the same.

Figure 8:
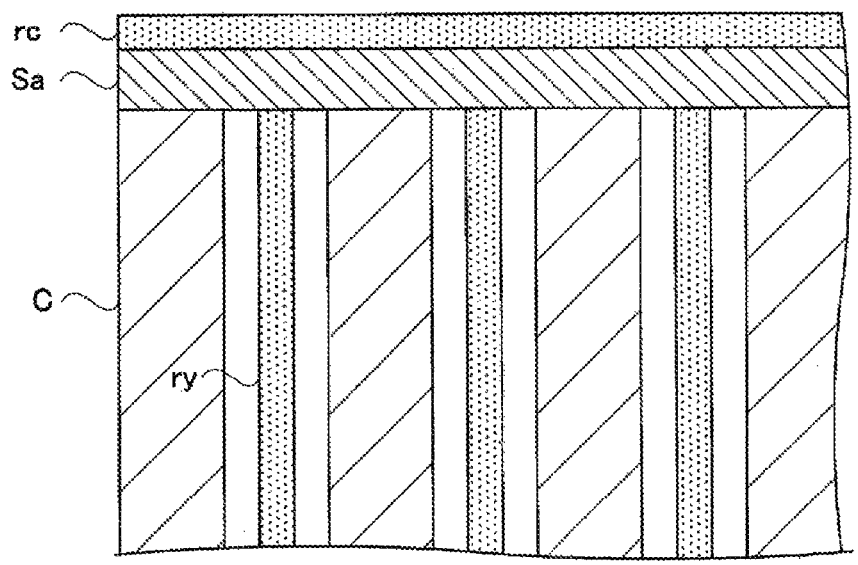
FIG. 8 is a schematic diagram for explaining the adhesive sheet according to Example 1.

FIG. 8 shows a side surface among the side surfaces of the scintillator 2 in which each of the scintillator crystals C arranged in the lateral direction is isolated by the reflective plates ry. A side surface among the side surfaces of the scintillator 2 in which each of the scintillator crystals C arranged in the vertical direction is isolated by the reflective plates rx is also the same in configuration as shown in FIG. 8. The state of adhering the adhesive sheet Sb to the upper end portion of the reflection plate rx is the same.

It should be noted that in FIGS. 7 and 8, almost no adhesive sheets Sa and Sb entered into the gap between the scintillator crystal C and the reflection plate ry. The aforementioned adhesive sheets Sa and Sb are solid. Therefore, the adhesive sheets Sa and Sb will not enter the gap between the scintillator crystal C and the reflection plate ry.

Figure 9:
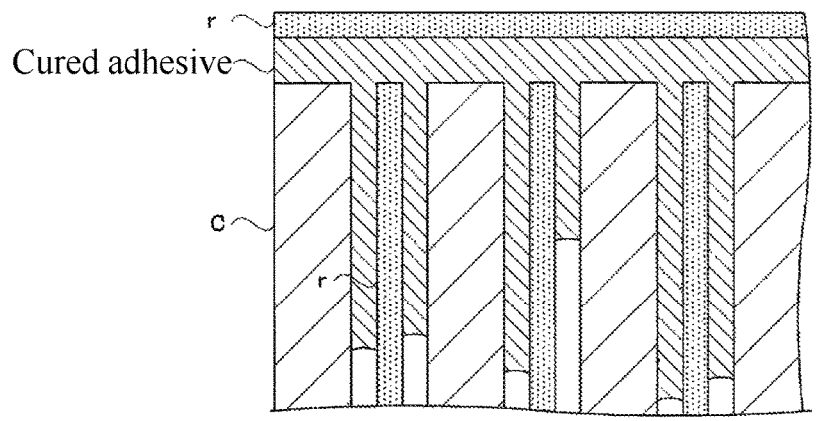
FIG. 9 is a schematic diagram for explaining the effects of the present invention.
Figure 17:
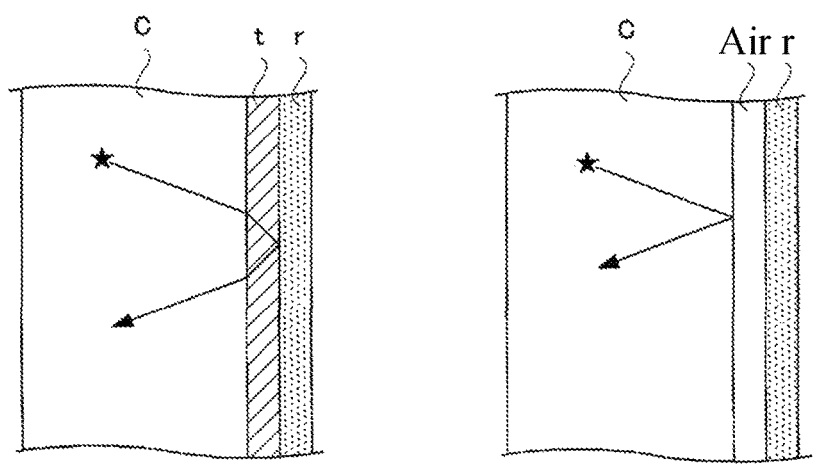
FIG. 17 is a schematic diagram for explaining a problem of a conventional configuration.
Figure 18:
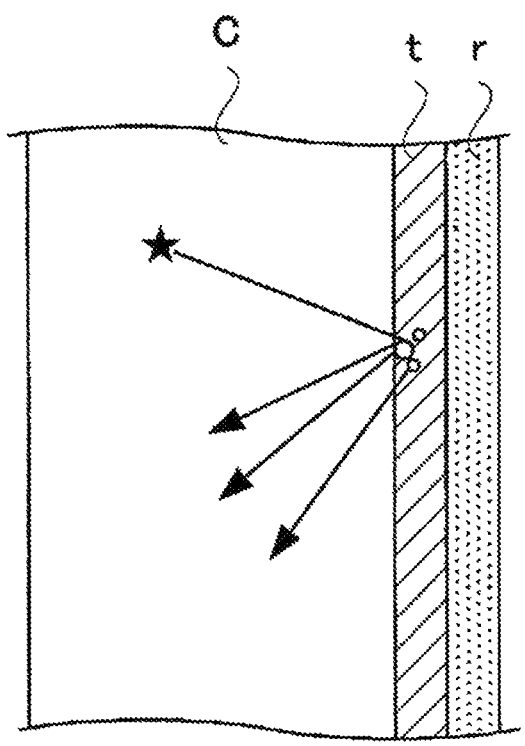
FIG. 18 is a schematic diagram for explaining a problem of a conventional configuration.

FIG. 9 illustrates a case in which an adhesive is used instead of the adhesive sheet Sa. The configuration of FIG. 9 shows a case in which the integration of the scintillator crystals C is performed by applying a liquid adhesive to one end of each scintillator crystal C. Since the air layer between the scintillator crystal C and the reflection plate ry is extremely thin, the liquid adhesive applied to one end of each scintillator crystal C deeply enters between the scintillator crystal C and the reflection plate ry due to the capillary phenomenon. Since there is no way to get rid of the adhesive, the adhesive will eventually cure as it is. As a result, a cured adhesive is interposed between the scintillator crystal C and the reflection plate ry. Such a configuration is not desirable as described with reference to FIGS. 17 and 18.

According to the present invention, since the adhesive sheets Sa and Sb do not enter the gap between the scintillator crystal C and the reflection plate ry, the gap between the scintillator crystal C and the reflection plate ry can be assuredly made into an air layer.

As described above, according to the present invention, the scintillator 2 can be configured by integrating the scintillator crystals C and the reflection plates rx and ry without using a permeable material. That is, according to the present invention, the adhesive sheets Sa and Sb are adhered to the end portions of the scintillator crystals C arranged in a matrix in the height direction. Each scintillator crystal C is integrated with the adhesive sheets Sa and Sb. According to the present invention, it is not required to configure the scintillator 2 with the scintillator crystals C and the reflection plates rx and ry by curing an adhesive, the adhesive before curing will not enter the gaps between the scintillator crystals C and the reflection plates rx and ry. The gap is an air layer. With such a configuration, the phenomenon that the fluorescence generated in the scintillator crystal is emitted out of the scintillator crystal becomes less likely to occur. This makes it possible to suppress that loss occurs when the fluorescence is reflected by the reflection plate and the fluorescence leaks to the adjacent scintillator crystal C through the reflection plates rx and ry. As a result, the decrease in the intensity of the fluorescence can be suppressed as much as possible.

In addition, when the adhesive sheet Sb is positioned between each scintillator crystal C and the light detector 3 and is a transparent sheet that allows fluorescence to pass through, the fluorescence generated by the scintillator crystal C will assuredly be incident to the light detector 3. As a specific configuration of the present invention, it may be configured to include a light guide 4 as will be detailed later.

When each scintillator crystal C and the light detector 3 are integrated by a common adhesive sheet Sb adhered thereto, it is possible to assuredly configure optical coupling between the scintillator crystal C and the light detector 3. As a specific configuration of the present invention, each scintillator crystal C and the light guide 4 may be integrated by a common adhesive sheet Sa and Sb adhered thereto.

The present invention is not limited to the aforementioned configuration, and may be modified as follows.

Figure 10:
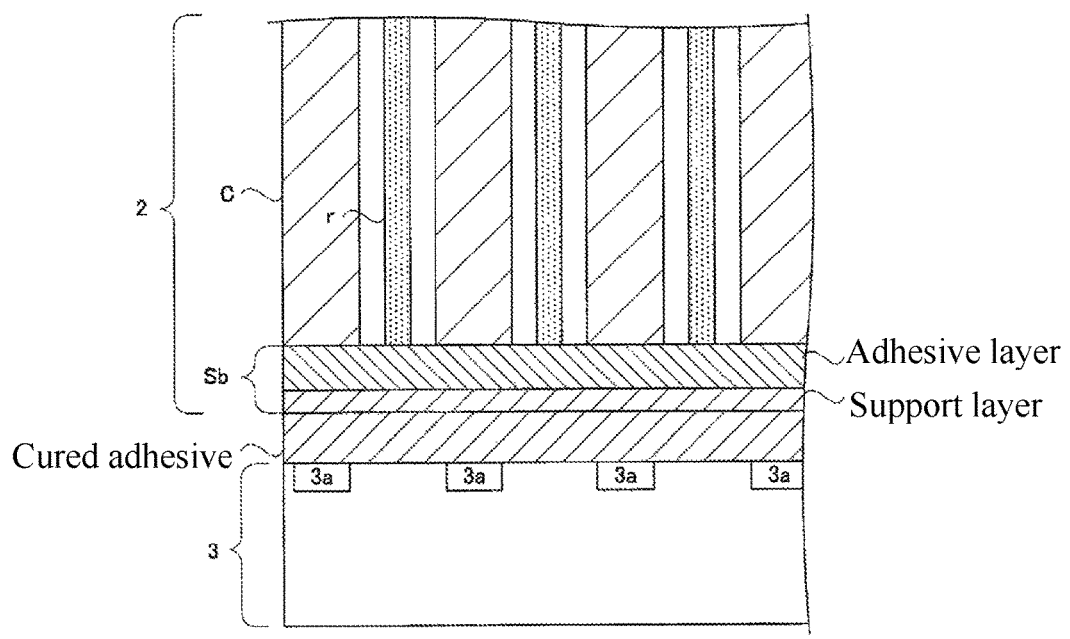
FIG. 10 is a schematic diagram for explaining one modified example of the present invention.

(1) According to FIG. 7, each of the scintillator crystals C and the light detector 3 are optically coupled by the adhesive sheet Sb of a double-sided adhesiveness type, but the present invention is not limited to this configuration. As shown in FIG. 10, the adhesive sheet Sb may be one side adhesive sheet. According to the configuration of FIG. 10, the adhesive sheet Sb is composed of an adhesive layer having adhesiveness and a transparent support layer having no adhesiveness. Bonding between the scintillator 2 and the light detector 3 can be performed by curing a liquid adhesive. The cured adhesive optically couples the scintillator 2 and the light detector 3. As described above, the surface of the adhesive sheet Sb of this modified example opposite to the surface to which each scintillator crystal C is adhered does not have adhesiveness, and the scintillator 2 and the light detector 3 or the light guide 4 are optically coupled by the cured adhesive. The cured adhesive corresponds to the connection material of the present invention.

Figure 11:
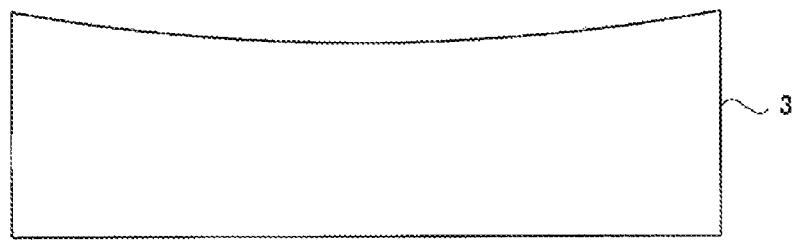
FIG. 11 is a schematic diagram for explaining one modified example of the present invention.

(2) According to FIG. 6, a semiconductor light receiving element is used as the light detector 3, but the present invention is not limited to this configuration. A light detector configured by a photomultiplier tube as shown in FIG. 11 may be used. Since such a light detector is a vacuum tube, the incident surface to which fluorescence is incident has a concave shape due to negative pressure.

Figure 12:
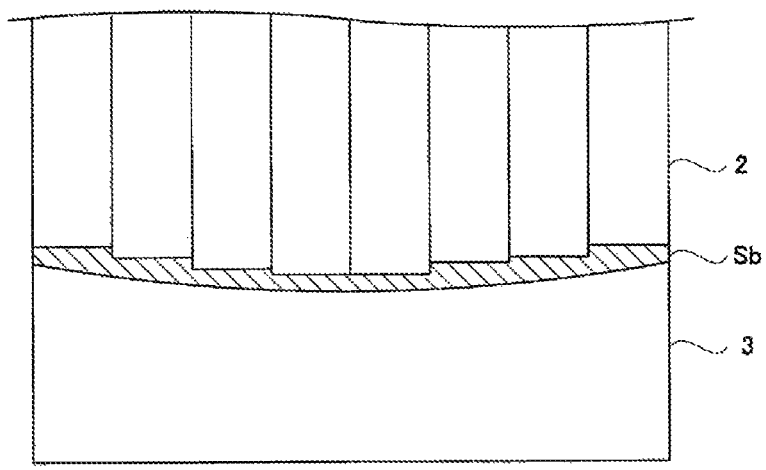
FIG. 12 is a schematic diagram for explaining one modified example of the present invention.

FIG. 12 shows the case in which the light detector 3 configured by a photomultiplier tube is applied to the radiation detector of the present invention. Since the bottom surface of the scintillator 2 of the present invention is configured by an adhesive sheet Sb having deformability, when the scintillator 2 is adhered to the light detector 3, the adhesive sheet Sb deforms along the curve of the incident surface of the light detector 3. The adhesive sheet Sb is adhered to the light detector 3 in a state in which the adhesive sheet is deformed in accordance with a distortion of a light receiving surface of the light detector 3 to which the fluorescence is incident. The thickness of the adhesive sheet Sb is constant even though it is deformed. Therefore, the distance from the light detector 3 to the scintillator crystal C is the same in any scintillator crystal C.

Figure 13:
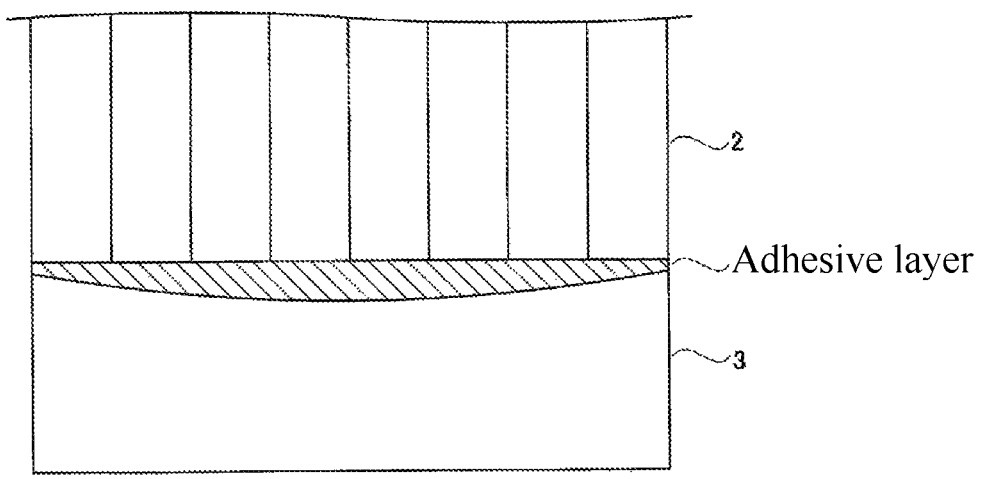
FIG. 13 is a schematic diagram for explaining one modified example of the present invention.

FIG. 13 shows a case in which the light detector 3 constituted by photomultiplier tubes is coupled to the scintillator 2 of a conventional configuration via a curable adhesive. In the case of FIG. 13, the scintillator crystals C constituting the scintillator 2 are fixed to each other by the adhesive. Therefore, when the scintillator 2 is adhered to the light detector 3, the scintillator 2 never deform along the curve of the incident surface of the light detector 3. Therefore, when an adhesive is poured in between the bottom of the planar scintillator 2 and the incident surface of the recessed light detector 3, the adhesive enters into the gap to fill the dent of the incident surface. This adhesive cures to become an adhesive layer. Then, the thickness of the adhesive layer becomes thicker at the central portion and thinner at the peripheral portion. In other words, the distance to the light detector 3 is uneven among scintillator crystals C.

The distance from the light detector 3 to the scintillator crystal C is preferably the same at any scintillator crystal C. This is because when the optical conditions of the scintillator crystal C become the same, fluorescence can be accurately detected. According to the present invention, the distances to the light detector 3 do not become uneven among the scintillator crystals C, and accordingly, the detection of fluorescence does not become inaccurate.

Figure 14:
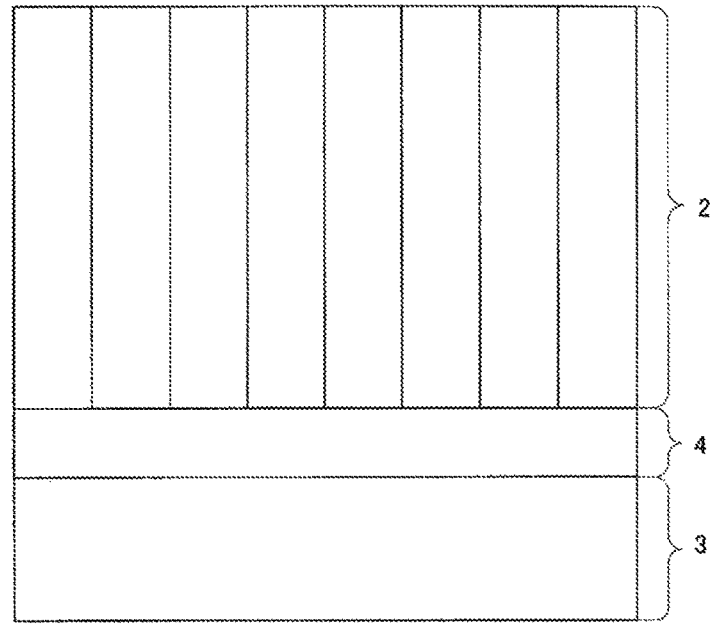
FIG. 14 is a schematic diagram for explaining one modified example of the present invention.
Figure 15:
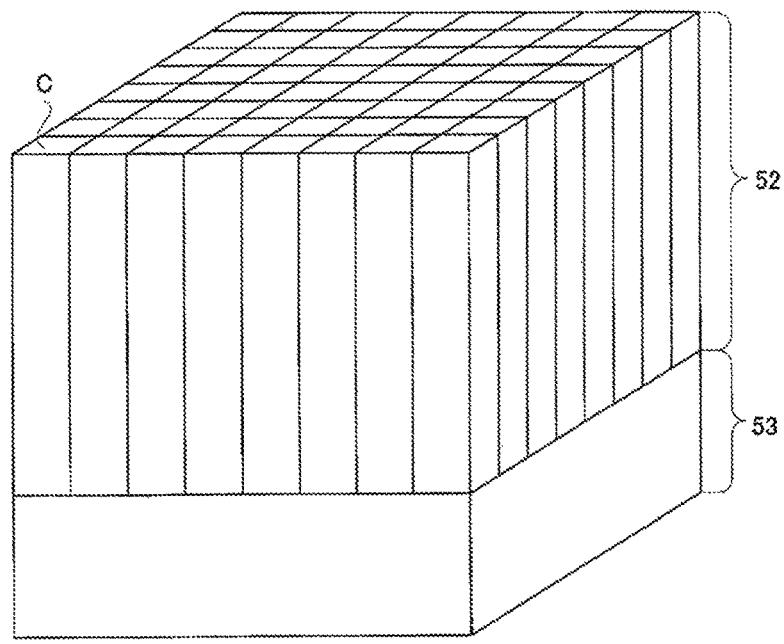
FIG. 15 is a perspective view for explaining a radiation detector having a conventional configuration.
Figure 16:
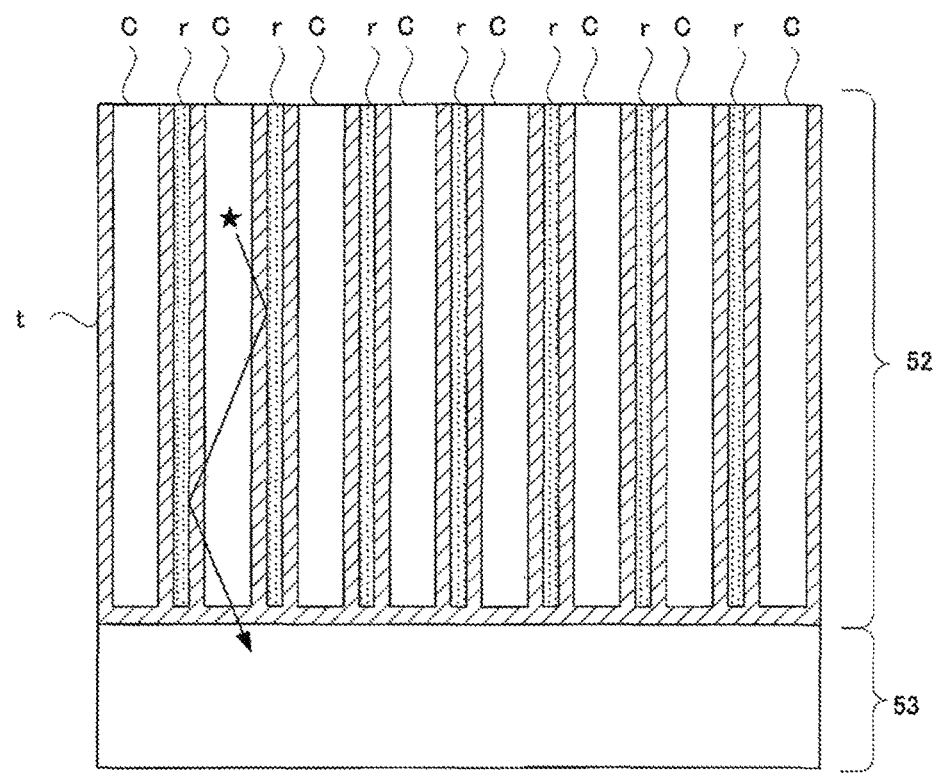
FIG. 16 is a plan view for explaining a radiation detector having a conventional configuration.

(3) According to FIG. 1, the scintillator 2 is connected to the light detector 3, but the present invention is not limited to this configuration. As shown in FIG. 14, the present invention may be configured such that a light guide 4 which guides the fluorescence generated by the scintillator 2 to the light guide 3 is provided at the position between the scintillator 2 and the light detector 3. In this case, it may be configured such that the adhesive sheet Sb of the scintillator 2 is adhered to the light guide 4.

(4) The radiation detector of the present invention can be mounted on a medical radiation imaging apparatus such as a PET (Positron Emission Tomography) apparatus. In particular, when used as a radiation detector for PET devices, it becomes possible to provide a radiation detector with an extremely excellent temporal resolution

INDUSTRIAL APPLICABILITY

As described above, the present invention is suitably used in a medical field.

DESCRIPTION OF REFERENCE SYMBOLS

C: scintillator crystal
rx, ry: reflection plate
Sa, Sb: adhesive sheet
2: scintillator
3: light detector
3a: semiconductor light receiving element
4: light guide

The invention claimed is:

1. A radiation detector comprising:
scintillator crystals that convert radiation into fluorescence;
reflection plates that reflect the fluorescence, the reflection plate being provided in a gap between the scintillator crystals arranged in a matrix;
an air layer provided at a position sandwiched by the reflection plate and the scintillator crystal;
a first adhesive sheet adhered to a first end of each of the scintillator crystals in a height direction; and
a second adhesive sheet adhered to a second end of each of the scintillator crystals in the height direction, the second end being opposite to the first end,
a light detector that detects the fluorescence is optically coupled to a surface of the first adhesive sheet opposite to a surface to which the scintillator crystals are adhered,
wherein a scintillator is formed by integrating the scintillator crystals with the first adhesive sheet.

2. The radiation detector as recited in claim 1,
wherein the first adhesive sheet is a transparent sheet that allows fluorescence to pass through, and
wherein a light detector that detects the fluorescence or a light guide that guides the fluorescence generated by the scintillator to the light detector is optically coupled to a surface of the first adhesive sheet opposite to a surface to which the scintillator crystals are adhered.

3. The radiation detector as recited in claim 2,
wherein the surface of the first adhesive sheet opposite to a surface to which the scintillator crystals are adhered has adhesiveness, and the first adhesive sheet is adhered to the light detector.

4. The radiation detector as recited in claim 3,
wherein the light detector is composed of a photomultiplier tube which is a vacuum tube, and
wherein the first adhesive sheet is adhered to the light detector in a state in which the first adhesive sheet is deformed in accordance with a distortion of a light receiving surface of the light detector to which the fluorescence is incident.

5. The radiation detector as recited in claim 2,
wherein the surface of the first adhesive sheet opposite to a surface to which the scintillator crystals are adhered does not have adhesiveness, and the scintillator is optically coupled to the light detector by a connection material.

6. The radiation detector as recited in claim 2,
wherein the light detector includes a semiconductor light receiving element.

7. The radiation detector as recited in claim 1,
wherein the first adhesive sheet is an acrylic adhesive sheet.

8. A radiation tomography apparatus equipped with the radiation detector as recited in claim 1.

9. The radiation detector of claim 1,
wherein a first set of the reflection plates extend in a first direction between first two or more pairs of adjacent scintillator crystals,
wherein a second set of the reflection plates extend in a second direction between second two or more pairs of adjacent scintillator crystals, the first and second directions being perpendicular to the height direction, and
wherein the first and second sets of the reflection plates have a same height.

10. The radiation detector of claim 1,
wherein with respect to a cross-section, side surfaces of the reflection plates are parallel with side surfaces of the scintillator crystals.

11. A radiation detector comprising:
scintillator crystals that convert radiation into fluorescence;
reflection plates that reflect the fluorescence, the reflection plate being provided in a gap between the scintillator crystals arranged in a matrix;

an air layer provided at a position sandwiched by the reflection plate and the scintillator crystal; and a first adhesive sheet adhered to a first end of each of the scintillator crystals in a height direction, a second adhesive sheet adhered to a second end of each of the scintillator crystals in the height direction, the second end being opposite to the first end, wherein a scintillator is formed by integrating the scintillator crystals with the first adhesive sheet, and wherein the first adhesive sheet absorbs a difference between a three-dimensional shape of a lower side of an array of the scintillator crystals and a three-dimensional shape of an incident surface of a light detector and integrates the array of the scintillator crystals and the light detector.

12. The radiation detector of claim 11, wherein a first set of the reflection plates extend in a first direction between first two or more pairs of adjacent scintillator crystals, and wherein a second set of the reflection plates extend in a second direction between second two or more pairs of adjacent scintillator crystals, the first and second directions being perpendicular to the height direction.

13. The radiation detector of claim 12, wherein the first and second sets of the reflection plates have a same height.

14. The radiation detector of claim 12, wherein each reflection plate of the first set of the reflection plates has first grooves extending from a top portion of the reflection plate, wherein each reflection plate of the second set of the reflection plates has second grooves extending from a bottom portion of the reflection plate, wherein the first set of the reflection plates and the second set of the reflection plates form a reflection plate frame by fitting the first grooves of the first set of the reflection plates with the second grooves of the second set of the reflection plates, and wherein each reflection plate of the first and second sets of reflection plates has the same height and the same thickness and is made of the same material.

15. The radiation detector of claim 11, wherein each scintillator crystal is separated from an adjacent scintillator crystal by a reflection plate, and wherein each reflection plate extends from a first end of the scintillator crystals to a second end of the scintillator crystals, the second end being opposite to the first end in the height direction.

16. The radiation detector of claim 15, wherein with respect to a cross-section, side surfaces of the reflection plates are parallel with side surfaces of the scintillator crystals.

17. The radiation detector of claim 11, wherein each of the reflection plates have the same height and the same thickness and are made of the same material.

* * * * *